March 20, 1956  R. W. HEISLER  2,738,992
PIPE COUPLING

Filed April 27, 1953  2 Sheets-Sheet 1

INVENTOR.
ROBERT W. HEISLER

BY *Virgil C Kline*
ATTORNEY

March 20, 1956 R. W. HEISLER 2,738,992
PIPE COUPLING
Filed April 27, 1953  2 Sheets-Sheet 2

INVENTOR.
ROBERT W. HEISLER
BY Virgil C. Kline
ATTORNEY

United States Patent Office 2,738,992
Patented Mar. 20, 1956

2,738,992

PIPE COUPLING

Robert W. Heisler, Somerville, N. J., assignor to Johns-Manville Corporation, New York, N. Y., a corporation of New York Application April 27, 1953, Serial No. 351,324

3 Claims. (Cl. 285—59)

This invention relates to pipe couplings and their method of assembly. While the invention has utility with many types of pipe, for example, steel or iron pipe, it is particularly adapted for use in the connecting of pipe sections composed of a hardened, compressed, fibro-cement composition, and, more particularly, where a completely non-metallic coupling comprising sections of asbestos-cement pipe is desired. The features of the invention have application both in couplings for so-called "pressure" pipe, in which the fluid pressures range normally in the neighborhood of 200–300 lbs./sq. in., and "non-pressure" pipe, in which the fluid pressures may range up to about 50 lbs./sq. in. The novel features of the invention may be utilized effectively on bell and spigot type couplings but provide particular advantages in sleeve type couplings, which permit the removal or replacement of pipe sections or the tapping into a line when desired.

Sleeve type couplings of the type upon which this invention has improved comprise flexible couplings in which a sleeve surrounds the adjacent ends of the pipe sections and is spaced therefrom in accordance with predetermined tolerances. The space is closed against fluid passage by resilient gaskets of rubber or the like, which have a relatively high resistance to deformation and are maintained under very considerable radial compressive forces and axial deformation between the sleeve and the pipe ends. This type of coupling is recognized as a friction type of joint, since it obtains its strength from the gaskets' resistance to deformation. Hydrostatic strength and resistance to frictional movement or blowout require gaskets having high deformation resistance. However, limited deformation resistance in the gaskets is required to permit assembly of the couplings without excessive difficulty. These two considerations require gasket compromises between very close limits. The nicety of the compromises involved is easier to appreciate when it is realized that the dimensions of the pipe ends and sleeve may vary uncomplementarily within permitted tolerance limits, which are usually relatively wide in the case of asbestos-cement elements because of the difficulty of manufacturing such abrasive materials to consistently close tolerances, and that the situation may be made more adverse by mis-alignment or deflection of the pipe ends by uneven trench loading conditions or other unfavorable conditions. The difficulties of achieving a satisfactory coupling design are further increased by the necessity for insuring against critical dislodgment of the gaskets in two directions, since both "pressure" and "non-pressure" pipe are subject to line pressure reversals to a negative or lower-than-atmospheric condition.

It will be apparent that the compromises mentioned above are exacting in nature and cannot always assure satisfactory results. When the deformation resistance of the gaskets is sufficient to prevent fluid leakage and gasket blowouts or critical dislodgment under both positive and negative pressures and the most adverse clearance conditions permitted under the tolerance limitations and deflection expectancies, the assembly of the pipe ends in the sleeve is frequently rendered quite difficult, especially in cold weather, when the resistance of the rings to deformation is increased.

In the case in particular of asbestos-cement pipe of the type mentioned, there are additional difficulties encountered because the pipe sections are subject to both moisture and thermal expansion and contraction, as well as to deflection, in most of the services involved. If the space between the pipe ends is not proper when the assembly of the coupling is complete, the ends may come into contact under service conditions and chip or crush each other, thus shortening the trouble-free life of the coupling. Not only is it difficult to determine when the spacing of the pipe ends is proper, but, it is also difficult to determine, in a sleeve type coupling, when the sleeve is centered over the pipe ends.

It is an object of this invention to overcome the difficulties noted above by providing a flexible pipe coupling of the type described which resists fluid leakage and gasket blowouts or critical dislodgment under both positive and negative pressures, including high positive pressures of the maximum order for which the pipe and sleeve or socket or similar coupling element are designed, and which at the same time requires a minimum effort to assemble. It is a particular object of the invention to eliminate the necessity for maintaining exacting requirements for the gaskets.

A further object of this invention is to provide a pipe coupling of the type described that will be capable of taking deflection and withstanding vibration and shock.

Another object of the invention is to provide a sleeve-type coupling which will enable the replacement of a pipe section and the repair of a defective line, or the tapping into a line, by the average workman, without difficulty.

A further object of the invention is to devise a pipe coupling of the aforesaid type in which the axially adjacent portions of the pipe ends will necessarily be properly spaced in the assembled condition, and in which the sleeve, in sleeve-type couplings, will automatically be centered over the pipe ends.

A still further object of the invention is to provide a completely non-metallic coupling that will satisfy the aforementioned requirements.

To accomplish the stated objects, my novel coupling is designed so that the resilient rings may be made readily deformable and need be placed under only a light initial radial compressive force such as to provide a sufficient initial seal to pick up the internal pressure (or external pressure, as the case may be) and transmit it, through the rings, to the surfaces to be sealed, namely, the inner surface of the sleeve or outer pipe section and the outer surface of the pipe end. The low resistance to deformation of the rings and the necessity for only a light radial compressive force on the rings makes assembly easy. Furthermore, the exacting requirements for the gaskets are largely eliminated. It is only necessary to determine that at least slight initial deformation will be readily obtained under the most adverse tolerance conditions or conditions of pipe deflection or misalignment. Under fluid pressure, the rings are forced more tightly against the surfaces to be sealed, and fluid leakage is prevented.

Significant structural features are incorporated in the elements of my novel coupling, whereby the use of readily deformable gaskets, even when held under only slight initial deformation against the surfaces to be sealed, is made feasible in both "presure" and "non-pressure" pipe. These features also serve to automatically space the adjacent end surfaces of the pipe sections properly and in the case of sleeve-type couplings, to center the sleeve over the pipe ends.

My invention will be more fully understood, and further objects and advantages thereof will become apparent by reference to the following detailed description in conjunction with the accompanying drawing, in which like reference characters designate like parts, and in which:

Fig. 3 is a view similar to Figs. 1 and 2, but showing in larger scale a coupling having the gaskets under somewhat greater deformation than the gasket shown at the left in Fig. 2, and in which the pipe ends are tapered in a different manner, the coupling elements being completely assembled, without effective line pressure on;

Fig. 4 is a view similar to Fig. 3, but showing the coupling in full, and on a smaller scale, with the gaskets held under lighter deformation, similarly to the gasket shown at the left in Fig. 2, and the pipe ends tapered as in Figs. 1 and 2, and with effective positive line pressure on;

Fig. 7 is a view similar to Figs. 5 and 6 but showing the inner pipe ends tapered as in Fig. 3, the coupling elements being shown completely assembled, and on a larger scale, without effective line pressure on;

Figure 2:
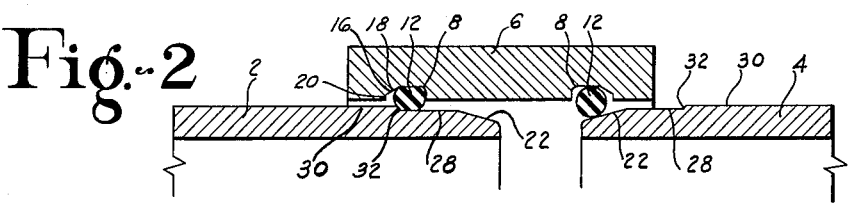
Fig. 2 is a view similar to Fig. 1, but showing the coupling partially assembled.
Figure 3:
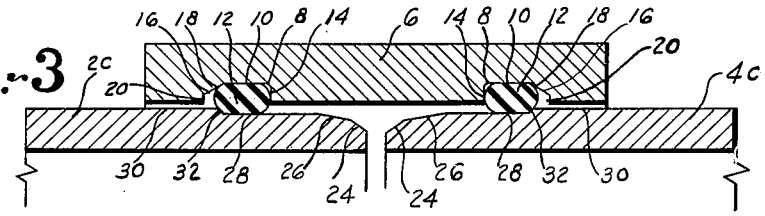
Figure 4:
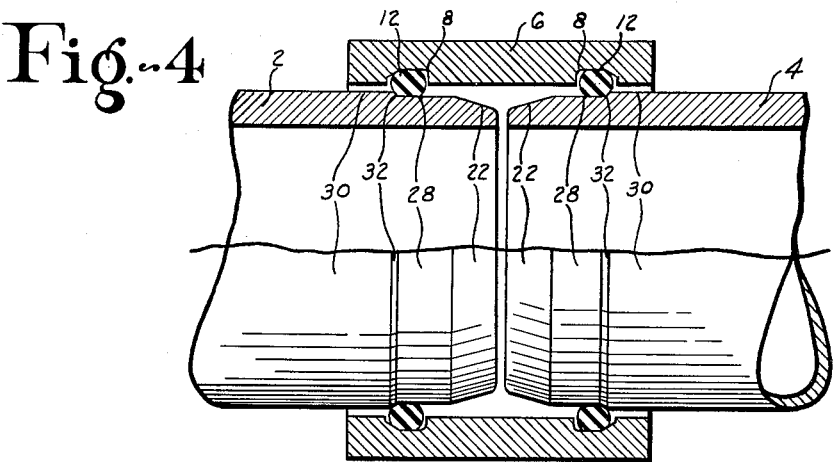
Figure 5:
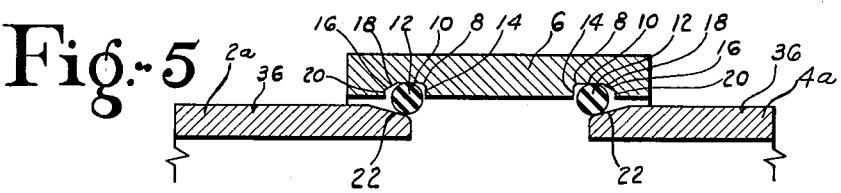
Fig. 5 is a view corresponding to Fig. 1 but showing the pipe ends slightly modified as preferred for effecting a pipe and/or coupling replacement in the field.
Figure 6:
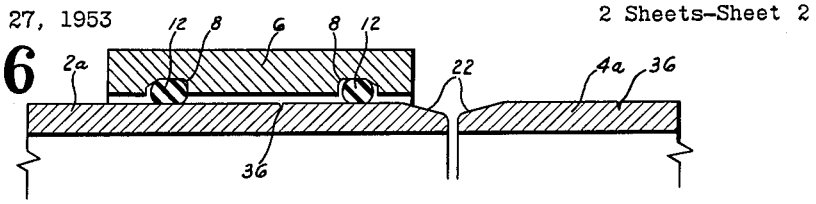
Fig. 6 is a view similar to Fig. 5 but showing the coupling elements of Fig. 5 in a stage of partial assembly.
Figure 7:
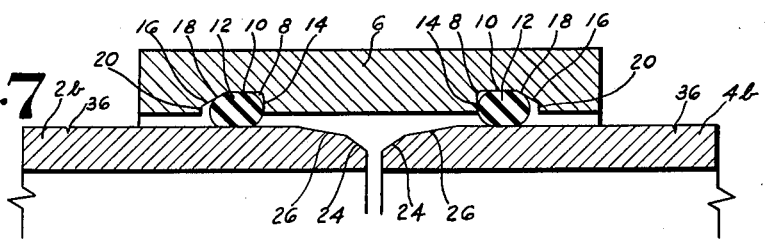
Figure 8:
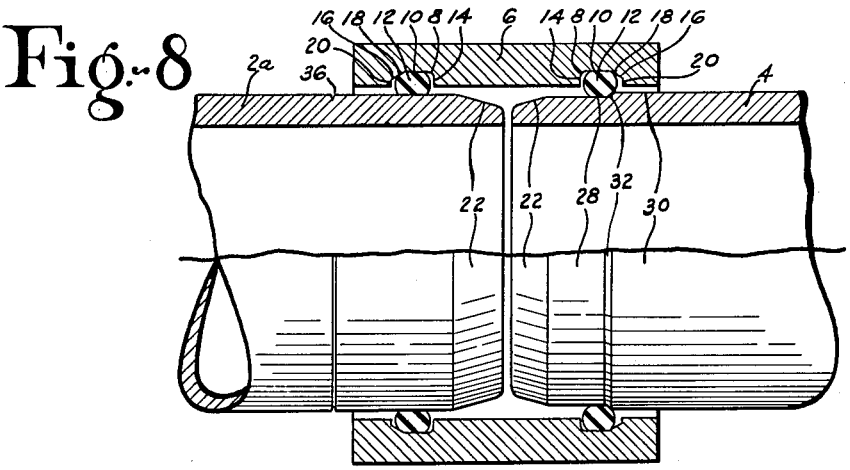
Figure 9:
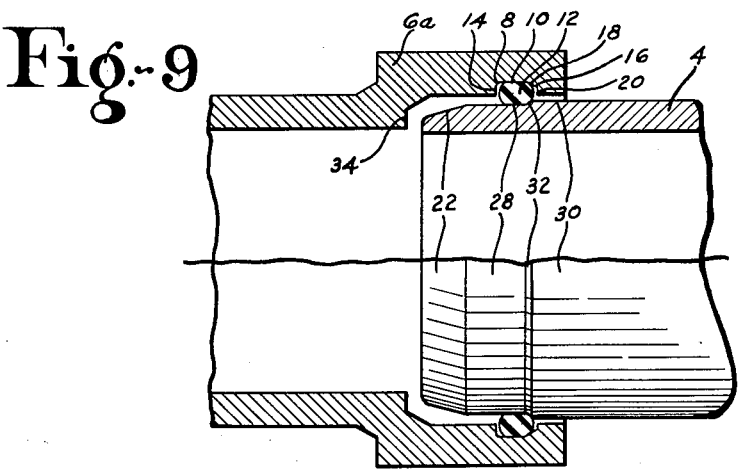

Fig. 8 is a view similar to Fig. 7, but showing the coupling in full, and on a smaller scale, with effective positive line pressure on, the end of the pipe section at the right being formed in this instance as shown in Fig. 4; and Fig. 9 is a view in cross-section taken on a plane through the common longitudinal axis of the elements of a bell-and-spigot type of coupling embodying features of the form of my invention shown in Figs. 1–8, the elements being shown in assembled relation, with effective positive line pressure on.

Referring more particularly to the drawing, Figs. 1–8 inclusive illustrate the application of the novel features of my invention to sleeve-type pipe couplings in various stages of assembly, in which the adjacent ends of generally co-axially arranged inner pipe sections 2, 2a, 2b, or 2c and 4, 4a, 4b, or 4c are, in the completed assembly position, spaced slightly from each other axially, as shown in Figs. 3, 4, 7, and 8. The inner pipe sections have generally cylindrical outer peripheries, and are surrounded at their adjacent ends by outer pipe section 6 forming a sleeve having a generally cylindrical inner circumference defining an axial opening therethrough and in which the adjacent ends of the inner pipe sections are received. The outer diameters of at least the end portions of the inner pipe sections received within the sleeve are sufficiently smaller than the inner diameter of the outer pipe section 6 that clearance is provided for axial movement and for limited canting of the several pipe sections relative to each other.

The sleeve 6 has annular grooves 8 formed radially outwardly from its inner circumference. An annular resilient readily deformable gasket 12 of rubber, synthetic rubber, or any suitable resilient and readily deformable plastic material is disposed in each of the grooves. The inside diameter of each gasket in its relaxed state preferably is slightly smaller than the outside diameter of the respective inner pipe section end, so that it is stretched somewhat when placed thereon. The outside diameter of each gasket relaxed preferably is substantially equal to the diameter of its respective groove, measured between opposite portions of its wall 10. The initial radial thickness of each of the gaskets, in its relaxed or undeformed state, thus is somewhat greater than the distance between the radially outer wall 10 of the respective groove 8 and the radially opposite portion of the outer periphery of the end of the respective inner pipe section, so that the gasket is flattened to some extent in a radial direction and deformed outwardly in an axial direction. The width of each of the grooves 8 is greater than the axial width of the respective gasket in its deformed state. Each groove 8 has an annular axial end wall 14 preferably extending substantially perpendicular to the axis of the outer pipe section and an axially opposite annular end wall 16 having an annular portion 18 inclined radially outwardly and axially toward end wall 14 and joining the radially outer wall 10 of the groove on a line spaced axially from the wall 14. Each end wall 16 also preferably has an annular portion 20 adjacent the inner circumference of the sleeve extending substantially perpendicular to the axis of the sleeve. It will be noted that the end wall 14 of each groove is located axially inwardly from its end wall 16 and nearer than end wall 16 to the axial inner terminal of the pipe section end disposed radially opposite the groove.

Pipe sections 2a and 4a as shown in Figs. 5 and 6 have their inner ends formed with substantially plain cylindrical outer peripheries except that portions 22 of the adjacent ends of these pipe sections are tapered at an angle of, for example, 10° to 15° with respect to the axis of the section. The inner pipe sections, 2b and 4b, shown in Fig. 7 have their peripheries similarly formed, except that their adjacent ends are tapered in a somewhat different manner, a peripheral portion 24 adjacent the inner end of each section being tapered on a rather steep angle, for instance approximately 45°, to the axis of the section, this tapered portion having a relatively short axial width, the remaining tapered portion 26 of the pipe section end being formed on a much smaller angle relative to the axis of the section, for instance in the neighborhood of 10°.

Figure 1:
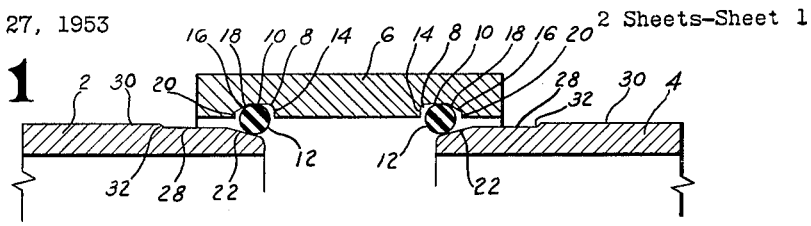
Fig. 1 is a view in cross-section taken on a plane through the common longitudinal axis of the elements of a sleeve-type pipe coupling embodying features of my invention and arranged in pre-assembly position, only the upper portion of the coupling being shown.

The inner pipe sections 2, 2a, and 4 in Figs. 1, 2, 4, and 8 have their adjacent ends formed with the single taper shown in Figs. 5 and 6, while the pipe sections 2c and 4c in Fig. 3 are given the two-stage form of taper shown in Fig. 7.

Each of the inner pipe sections 2, 2c, 4, and 4c, in Figs. 1–4 inclusive, and inner pipe section 4 in Fig. 8, has its generally cylindrical outer periphery formed with two annular portions 28 and 30 of different outside diameters joined by a shoulder 32 extending generally radially outwardly and axially away from the inner end of the section and preferably being inclined at a fairly steep angle to the axis of the section, such as 45° or more. The annular portion 28 of smaller outside diameter is located axially closer than the annular portion 30 to the axially inner extremity of the pipe section end. In the completely assembled coupling, annular portion 28 is disposed substantially radially oppositely of the radially outer wall 10 of the groove in the corresponding end of the sleeve 6, and is spaced therefrom so that the respective gasket is held therebetween and deformed as previously described. The shoulder 32 is so spaced from the inner extremity of the pipe section as to contact the axially outer side of the gasket supported on portion 28 when the gasket in its initially deformed state is in contact at its axially inner side with the end wall 14 of the groove and the pipe section ends are properly positioned axially relative to each other.

Fig. 9 illustrates the application of features of the invention to a bell-and-spigot type coupling. In the illustrated example, the spigot or inner pipe section is formed and designated the same as inner pipe section 4 in the preceding figures. The groove formed in the bell or outer pipe section 6a is shaped in cross-section similarly to the grooves shown in the outer pipe sections 6 of the sleeve-type couplings previously described. It will be noted that the inner end of the inner pipe section 4 of Fig. 9 is spaced slightly from shoulder 34 formed on the inside of the section 6a, similarly as the adjacent ends of the inner pipe sections are spaced from each other in the sleeve-type couplings of Figs. 1–8. Clearance for limited relative canting and deflection of the bell and spigot is also provided.

The manner in which the novel features of my coupling function to produce the advantages sought will be more clearly understood from a description of the method of assembly of the various types of couplings and the operation of each under line pressure, as illustrated progressively in the several features of the drawing.

Referring to Fig. 1, the ends of the inner pipe sections 2 and 4, the walls of the grooves 8, and the gaskets 12 are coated with a suitable lubricant. The pipe sections are then placed in the relationship shown in Fig. 1, with the gaskets in the grooves, and the ends of the inner pipe sections externally of the sleeve are pulled or pushed toward each other and into the sleeve. The tapered portions 22 facilitate the entry of the inner pipe section ends into the sleeve. The end of the sleeve and the respective gasket which offer least resistance to the entry of the corresponding inner pipe section end will permit that pipe section to seat first with its shoulder 32 against the gasket and the gasket against wall 14, in the position of pipe section 2 as illustrated in Fig. 2. The other pipe end then comes into assembled position, as illustrated by pipe section 4c in Fig. 3, the shoulders 32 acting in conjunction with the gaskets and the end walls 14, against which the gaskets react in the assembly procedure, to space the adjacent ends of the inner pipe sections automatically at a desired distance from each other, and preferably with the sleeve axially centered thereover.

The difference in the degrees of gasket deformation that may be successfully employed are illustrated by contrastings Figs. 2 and 4 with Fig. 3, the degree of gasket flattening in a radial direction in Fig. 3 being somewhat greater than is the case in the coupling illustrated in Figs. 2 and 4. Fig. 3 illustrates the condition in which line pressure is off, in other words, in which there is no pressure differential between the fluid inside the pipe and the surrounding atmosphere. In this condition, which is that normally encountered upon the completion of assembly, shoulders 32 and end walls 14 are in light contact with opposite sides of the gaskets. Fig. 4 illustrates the condition in which there exists positive line pressure of the order previously mentioned, which forces the pressure side of the gasket away from the end wall 14 of its groove, so that fluid pressure may be exerted on the entire pressure side of the gasket. At the same time, the gasket is deformed, or flows, axially outwardly so that a greater portion of its surface comes into contact with the inclined annular portion 18 of end wall 16 of the groove, and the lower portion of the low pressure side of the gasket is forced more firmly against the shoulder 32. The reaction of the gasket against the annular portion 18 and the shoulder 32 serves to increase the effective unit pressure of the gasket on the surfaces 11 and 28, or the equivalent, to be sealed. The portion 18 and the shoulder 32 also cooperate to prevent critical dislodgment or blowout of the gasket under high line pressures. Annular portion 20 of the end wall 16 serves further in this capacity, acting to prevent the extrusion of the gasket therebeyond under the most extreme internal line pressures. End wall 14 prevents critical gasket dislodgment under line pressure reversals, in which the pressure differential between the negative line pressure and atmospheric is of course not as great as is the normal differential in the other direction.

Fig. 5 illustrates the arrangement of the several pipe sections at the start of an assembly procedure, involving inner pipe sections 2a and 4a on which shoulder 32 has been omitted, principally to make the replacement of a sleeve or inner pipe section easier. The pipe sections are disposed in the same relative positions as at the beginning of the assembly operation illustrated in Figs 1–3, and the walls of the grooves, the gaskets and the inner pipe section ends are similarly lubricated. In this case however, the inner pipe section 2 and the sleeve 6 are drawn together axially of each other as shown in Fig. 6, until the sleeve is mounted completely on the end of the inner pipe section. This step is rendered considerably easier to accomplish because of the omission of shoulder 32. The sleeve is then backed off over the adjacent end of the pipe section 4b to a completed assembly position such as shown with line pressure off in Fig. 7 for the modified coupling in which the inner pipe ends 2b and 4b have the two-stage taper previously described. This position, in which the sleeve is centered and the inner pipe section ends are properly spaced, is conveniently determined by reference to score lines 36 which may be formed on the outer periphery of each inner pipe section at a desired predetermined distance from its inner end.

Where the pipe sections adjoining the defective section of the line are formed with a shoulder 32, as is pipe section 4 in Fig. 8 (which shows a completed coupling assembly with effective positive line pressure on), in which pipe section 2a may be regarded as a replacement section, the sleeves 6 may desirably be mounted on the opposite ends of the replacement pipe section, in the manner shown in Fig. 6, after which the sleeves may be backed over the adjoining pipe section ends, on which the shoulders 32 will function as previously described to automatically locate the replacement pipe ends properly relative to their respective sleeves. However, in this case, illustrated by Fig. 8, the replacement pipe section 2a and adjoining pipe section 4 will not have their adjacent ends automatically properly spaced from each other, it being necessary to refer to score line 36 on replacement section 2a for this purpose.

The coupling illustrated in Figs. 5–7 of course loses the advantages provided by the shoulder 32, but because of the retention of the other features, including the cross-sectional form given the grooves 8 and the described relation of the axial width of the grooves to that of their respective gaskets in their deformed state, this coupling will withstand all pressures encountered even in "pressure" pipe.

As previously noted, Figs. 8 and 9 illustrates the condition in which effective positive line pressure is on, the movement or distortion of the gaskets to the low pressure side being similar to that shown and described in connection with Fig. 4. Where the shoulder 32 is omitted from the inner pipe section end, as on section 2a in Fig. 8, a greater surface portion of the gasket on that section may be urged into contact with the annular portion 18 of the end wall 16 of the groove at that end of the sleeve. This compensates considerably for the loss of the function of the shoulder 32 in the sealing operation.

The two-stage type of taper given the inner pipe section ends in Figs. 3 and 7 has certain advantages over the single-taper form in that it not only facilitates the leading of the inner pipe section ends through the gaskets, but because of its shorter total axial length, decreases the time required for assembly, and also provides a greater wall thickness close to the inner extremities of the inner pipe section ends. This greater wall thickness appreciably increases the strength of the pipe at a somewhat vulnerable point. The change in the angle of slope of the tapered portion 26 from that shown at 24 is important in compensating for the greater resisance to the assembly effort encountered as the ring is progressively flattened in traveling up the slope 24.

It will be apparent that the instant invention overcomes the difficulties noted and accomplishes the stated objects. When the pipe sections of the instant coupling are formed with the structural features illustrated, the critical requirements for maintenance of clearances to close tolerance standards and the exacting requirements as to the deformation resistance of the gaskets are both greatly reduced. It is possible to obtain a completely satisfactory coupling using gaskets which are readily deformable, instead of depending on high gasket deformation resistance and a tight friction fit to provide the necessary hydrostatic strength. At the same time, the degree of deformation of the gaskets is not criitcal, but may vary over a relatively wide range. For instance, an effective seal may be obtained with the gaskets flattened in a radial direction by as little as 10% or less of the radial thickness of the gasket in its relaxed state or with the gaskets flattened so as to diminish their radial thickness by as much as 50% or more.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. A pipe coupling for confining a fluid therein comprising, an inner pipe section having an end portion of generally cylindrical outer circumference but comprising two annular portions of different substantially constant outside diameters joined by a shoulder extending generally radially outwardly at a relatively steep angle to the axis of said inner pipe section, an outer pipe section having a generally cylindrical inner circumference defining an opening receiving said end portion of said inner pipe section, the annular portion of said inner pipe section end having the smaller outside diameter being located the closer axially to the axially inner extremity of the inner pipe section, the maximum outside diameter of said end portion being somewhat smaller than the diameter of said opening to provide clearance for axial movement and limited canting of the pipe sections relative to each other, said outer pipe section having an annular groove formed generally radially outwardly from its inner circumference and having a radially outer wall radially opposite at least a part of said annular portion of smaller outside diameter, and a resilient readily deformable gasket in said groove having a greater initial radial thickness than the distance between said radially outer wall of the groove and said radially opposite portion of the outer circumference of said inner pipe section end portion and being engaged therebetween under relatively light radial compressive force in assembled relation and at least slightly flattened in a radial direction, said groove having generally radially extending axial end walls and a somewhat greater width axially of the outer pipe section and between said end walls than the thickness of the gasket in that direction in its initially flattened state to provide space for limited axial deformation of the gasket material toward and against either one of the axial end walls of the groove and away from the respective other end wall in response to a fluid pressure differential resulting in a greater effective fluid pressure on that side of the gasket lying toward said respective other end wall of the groove, said shoulder being spaced a desired, predetermined distance from said inner extremity of the inner pipe section, said predetermined distance being such that said shoulder positively orients said inner pipe section in a desired predetermined position axially with respect to said outer pipe section when said pipe sections and gasket are brought together in the aforesaid relationship in assembly of the coupling with said shoulder and the one end wall of said groove axially opposite said shoulder both in contact with said gasket, said shoulder lying at least in part radially opposite the other one of said end walls of the groove in said assembled relationship.

2. A pipe coupling as defined in claim 1, in which said outer pipe section is in the form of a sleeve, and comprising further a second inner pipe section having an end portion formed similarly to the first-mentioned inner pipe section end portion and similarly received in, and related to, the opposite end of said sleeve, and a second gasket similarly received therebetween, at least said inner pipe sections comprising hardened, compressed, fibro-cement material, said inner pipe section end portions and said sleeve being disposed in generally coaxial relationship, the spacing of the annular wall portions on the inner pipe sections from their respective axially inner extremities being such that said extremities are spaced at a desired predetermined distance axially from each other with the gaskets and associated wall portions at the opposite ends of the sleeve and on the inner pipe section end portions respectively in contact as aforesaid, and also with the shoulder on each inner pipe section lying at least in part radially opposite the respective said other one of said end walls of the associated groove.

3. A pipe coupling for confining a fluid therein comprising, an inner pipe section having an end portion of generally cylindrical outer circumference, an outer pipe section having a generally cylindrical inner circumference defining an opening receiving said end portion of said inner pipe section, the outside diameter of said end portion being somewhat smaller than the diameter of said opening to provide clearance for axial movement and limited canting of the pipe sections relative to each other, the outer circumference of said end portion having a substantially cylindrical annular portion, said outer pipe section having an annular groove formed radially outwardly from its inner circumference with a radially outer wall of substantially cylindrical inner circumference substantially parallel to the axis of the outer pipe section and radially opposite at least a part of said annular portion when said pipe sections are properly positioned axially relative to each other, and a resilient readily deformable gasket in said groove having a substantially circular cross-sectional shape in relaxed condition and a greater initial radial thickness than the distance between the radially outer wall of the groove and said annular portion and being engaged thereby in assembled relation under relatively light radial compressive force and at least slightly flattened in a radial direction, said groove having axial end walls providing a space therebetween somewhat greater than the axial width of the gasket in its initially deformed state to provide space for limited axial deformation of the gasket material toward and against either one of said end walls and away from the respective other end wall in response to a fluid pressure differential resulting in a greater effective fluid pressure on that side of the gasket lying toward the respective other end wall, the axial end wall nearer the axially inner extremity of the inner pipe section being substantially perpendicular to the axis of the outer pipe section, and the axially opposite end wall having an annular portion inclined relatively sharply radially outwardly and axially toward said nearer end wall and joining the radially outer wall of the groove on a line spaced axially from said nearer end wall, said substantially cylindrical annular portion terminating at its axial end which is the more remote from the axially inner extremity of the inner pipe section in an annular shoulder rigid with said inner pipe section and inclined relatively sharply radially outwardly, and axially away from said annular portion, said shoulder being spaced a predetermined distance from the axially inner extremity of the inner pipe section end so as to orient said extremity in the desired relationship axially of said outer pipe section and to lie at least in part radially opposite said annular inclined portion of said opposite end wall of the groove with said shoulder facing said end wall of said groove nearer said extremity, and spaced from the latter end wall by the intervening thickness of said gasket in its said initially deformed state when said pipe sections and gasket are brought together in the aforesaid relationship in assembling the coupling.

(References on following page)

References Cited in the file of this patent

UNITED STATES PATENTS

| | | |
|---|---|---|
| 865,498 | Kenyon | Sept. 10, 1907 |
| 906,849 | Baashuus | Dec. 15, 1908 |
| 2,184,376 | Beyer et al. | Dec. 26, 1939 |
| 2,209,235 | Nathan | July 23, 1940 |
| 2,398,399 | Alexander | Apr. 16, 1946 |
| 2,462,586 | Whittingham | Feb. 22, 1949 |
| 2,470,818 | Hirsh | May 24, 1949 |
| 2,478,127 | Parker | Aug. 2, 1949 |
| 2,639,169 | Jones | May 19, 1953 |

FOREIGN PATENTS

| | | |
|---|---|---|
| 147,403 | Austria | Oct. 26, 1936 |
| 316,747 | England | Aug. 8, 1929 |
| 415,425 | England | Aug. 24, 1934 |
| 458,958 | Great Britain | Mar. 11, 1936 |